(12) United States Patent
Fiedler (10) Patent No.: US 10,315,549 B2
(45) Date of Patent: Jun. 11, 2019

(54) CLOSURE DEVICE WITH STATUS DISPLAY

(71) Applicant: Fidlock GmbH, Hannover (DE)

(72) Inventor: Joachim Fiedler, Hannover (DE)

(73) Assignee: Fidlock GmbH, Hannover (DE)

(*) Notice: Subject to any disclaimer, the term of this patent is extended or adjusted under 35 U.S.C. 154(b) by 135 days.

(21) Appl. No.: 15/124,430

(22) PCT Filed: Mar. 10, 2015

(86) PCT No.: PCT/EP2015/054967
§ 371 (c)(1),
(2) Date: Sep. 8, 2016

(87) PCT Pub. No.: WO2015/135941
PCT Pub. Date: Sep. 17, 2015

(65) Prior Publication Data
US 2017/0015229 A1    Jan. 19, 2017

(30) Foreign Application Priority Data

Mar. 10, 2014   (DE) .................... 10 2014 103 181

(51) Int. Cl.
*B60N 3/04* (2006.01)
*F16B 1/00* (2006.01)
*F16B 27/00* (2006.01)

(52) U.S. Cl.
CPC ............ *B60N 3/046* (2013.01); *F16B 1/0071* (2013.01); *F16B 27/00* (2013.01)

(58) Field of Classification Search
CPC .......... B60N 3/046; B60N 3/04; B60N 3/042; F16B 1/0071; F16B 27/00; Y10T 24/30;
(Continued)

(56) References Cited

U.S. PATENT DOCUMENTS 5,368,427 A * 11/1994 Pfaffinger ............... F16B 21/04
24/580.1
6,205,619 B1 * 3/2001 Jang .......................... E05D 5/10
16/352

(Continued)

FOREIGN PATENT DOCUMENTS

DE        3424075 A1   1/1986
DE       19739950 A1   4/1999
(Continued)

*Primary Examiner* — Jason W San
(74) *Attorney, Agent, or Firm* — The Webb Law Firm (57) ABSTRACT

A closure device for connecting two parts with one another includes a first closure part and a second closure part attachable in an attachment direction on the first closure part and has a housing and connection element arranged moveably on the housing along an adjustment direction which differs from the attachment direction. The connection element is attachable to the first closure part in the attachment direction and during attachment is moved in the adjustment direction relative to the housing from a first position into a second position. In a closed position, the connection element is located in the second position and is connected to the first closure part in such that the second closure part is held on the first closure part. The connection element is tensioned in the direction of the first position with respect to the housing.

19 Claims, 7 Drawing Sheets

(58) Field of Classification Search
CPC ... Y10T 24/301; Y10T 24/302; Y10T 24/309; Y10T 24/4578; A47G 27/04
See application file for complete search history.

(56) References Cited

U.S. PATENT DOCUMENTS

| | | | | |
|---|---|---|---|---|
| 8,370,994 B2* | 2/2013 | Duan | ............... | G06F 1/1681 16/303 |
| 8,851,551 B1* | 10/2014 | Kaufman | ............... | B60N 3/046 16/4 |
| 9,517,712 B1* | 12/2016 | Masanek, Jr. | ............... | B60N 3/044 |
| 9,961,966 B2* | 5/2018 | Ryan | ............... | A44B 1/14 |
| 2001/0004784 A1* | 6/2001 | Calabrese | ............... | B60N 3/046 16/8 |
| 2002/0124363 A1* | 9/2002 | Gombert | ............... | F16B 21/07 24/662 |
| 2005/0218758 A1* | 10/2005 | Thackery | ............... | E05C 3/041 312/222 |
| 2007/0257506 A1* | 11/2007 | Kenny | ............... | B60N 3/046 296/97.23 |
| 2009/0007371 A1* | 1/2009 | Connor, Jr. | ............... | B60N 3/046 16/4 |
| 2009/0178249 A1* | 7/2009 | Jalbert | ............... | F16B 5/0657 24/591.1 |
| 2009/0235485 A1* | 9/2009 | Connor, Jr. | ............... | B60N 3/046 16/4 |
| 2012/0291227 A1 | 11/2012 | Fiedler | | |
| 2013/0287996 A1* | 10/2013 | Masanek, Jr. | ............... | B60N 3/044 428/131 |
| 2015/0063950 A1* | 3/2015 | Li | ............... | F16B 21/04 411/500 |
| 2015/0104247 A1* | 4/2015 | Wang | ............... | F16B 21/04 403/349 |
| 2016/0007696 A1* | 1/2016 | Neblett | ............... | A43B 3/122 24/702 |
| 2017/0028895 A1* | 2/2017 | Masanek, Jr. | ............... | B60N 3/046 |
| 2017/0057420 A1* | 3/2017 | Fiedler | ............... | B60R 11/00 |
| 2017/0276290 A1* | 9/2017 | Fiedler | ............... | A45C 13/10 |

FOREIGN PATENT DOCUMENTS

| | | |
|---|---|---|
| WO | 2011095515 A1 | 8/2011 |
| WO | 2012095823 A1 | 7/2012 |

* cited by examiner

CLOSURE DEVICE WITH STATUS DISPLAY

CROSS-REFERENCE TO RELATED APPLICATIONS

This application is the United States national phase of International Application No. PCT/EP2015/054967 filed Mar. 10, 2015, and claims priority to German Patent Application No. 10 2014 103 181.4 filed Mar. 10, 2014, the disclosures of which are hereby incorporated in their entirety by reference.

BACKGROUND OF THE INVENTION

Field of the Invention

The invention relates to a closure device for connecting two parts with one another.

Description of Related Art

Such a closure device for connecting two parts with one another comprises a first closure part and a second closure part which is attachable in an attachment direction to the first closure part and which has a housing and a connection element which is arranged movably on the housing in an adjustment direction which differs from the attachment direction. For closing the closure device the connection element is attachable to the first closure part in the attachment direction and during attachment is moved in the adjustment direction relative to the housing from a first position into a second position. In a closed position of the closure device the connection element is located in the second position and is connected to the first closure part in such a way that the second closure part is held on the first closure part.

The connection element of the second closure part is pretensioned in the direction of the first position with respect to the housing. When the closure device is open (i.e. when the closure parts are separated from one another) the connection element is thus located in the first position, the connection element being automatically moved into the first position after the closure device is opened, due to the pretensioning.

For (renewed) closure of the closure device the second closure part may be attached to the first closure part, whereby the connection element of the second closure part is moved in the adjustment direction relative to the housing and as a result reaches its second position in which a connection is produced between the closure parts and the closure device is thus closed.

Closure devices of this type are generally able to be used to connect two parts together. Such closure devices in this case may be used, in particular, in order to connect parts safely and reliably together. In this case, accordingly there may also be a requirement for a user to be able to identify in a simple manner that the closure device has been completely and correctly closed.

This is important, in particular, where a potentially incomplete closure of the closure device could lead to a risk to the safety of a user. For example, with a foot mat in a vehicle, care has to be taken that a closure for connecting the foot mat to a vehicle floor is completely closed when attaching the foot mat to the vehicle floor, since otherwise—when the closure device is incompletely closed—it could lead to an alteration of the position of the foot mat in the vehicle which, in particular, may represent a safety risk at the driver's seat with the pedals placed in front.

A closure device for connecting a foot mat to a vehicle floor is disclosed in WO 2011/095515 A1, which comprises a display device with a magnet movably arranged on a housing part. When the closure device is open the magnet is located in a first position and when the housing part is attached to a plug part, due to the interaction with a magnet of the plug part, the magnet is transferred into a further second position. By altering the position of the magnet, it is displayed that the closure device has reached its closed position.

A display device as disclosed in WO 2011/095515 A1 is suitable for closure devices which have magnetic elements for assisting the closure of the closure device. Thus in the closure device of WO 2011/095515 A1 magnets are arranged on the closure parts, said magnets opposing one another in a magnetically attractive manner when attaching the closure parts.

SUMMARY OF THE INVENTION

It is an object of the invention to provide a closure device which is able to display safely and reliably that the closure device has reached its closed position and at the same time is also able to be designed purely mechanically, i.e. without magnetic elements.

This object is achieved by a subject of the invention having the features of as described herein.

Accordingly, a display device arranged on the second closure part is additionally provided, said display device being adjustable by a movement of the connection element relative to the housing and being located in a first display position in the first position of the connection element and being located in a second display position in the second position of the connection element.

The present invention is based on the idea of providing a display device which is able to be adjusted between different display positions and, as a result, displays the position in which the closure device is currently located. The display device in this case is adjusted by moving the connection element of the second closure part and is thus coupled to the connection element and the position thereof.

Since when closing the closure device the connection element is mechanically moved in the adjustment direction due to the attachment of the second closure part to the first closure part, it may be directly concluded from the position of the connection element whether the closure device is in its open position or its closed position. When the closure device is open, i.e. when the closure parts are separate from one another, the connection element is in its first position since the connection element is pretensioned into the first position, for example, via a resilient spring or by magnetic means. When attaching the closure parts to one another, the connection element is transferred into the second position, whereby the display device is also transferred from its first display position into the second display position so that it is immediately displayed that the closure device has been closed.

In this connection it should be mentioned that, in principle, it is also possible to position the first closure part on the second closure part. It is only important for the closure parts to be attached to one another for closing the closure device.

In principle, a plurality of first positions and a plurality of second positions may also be present. In the first positions, the closure device in each case is open. In the second positions, the closure device is closed, wherein the connection element is always pretensioned from a second position into a first position.

From the display position which the display device currently adopts, a user is able to identify immediately the position in which the closure device is located. In particular, the display device only reaches the second display position when the connection element has been transferred into its second position and the closure device has thus been closed. It is thus ensured that the closure device is completely closed when the display device is located in its second display position assigned to the closed position.

The connection element is connected, for example, to an actuating element such that via the actuating element the connection element is able to be adjusted relative to the housing, in particular for opening the closure device. When the actuating element is adjusted, the display device is also adjusted. If the closure device is opened by actuating the actuating element, for example, by the connection element being transferred from its second position into the first position, the display position of the display device is also altered from the second display position to the first display position so that it is displayed that the closure device has been opened.

The display device may comprise, for example, at least two display fields, a first display field being visible in the first position of the connection element and a second display field being visible in the second position of the connection element. The display fields of the display device preferably carry different markings, for example different color markings or labeling so that by means of the display fields it is possible to identify immediately the position in which the closure device is located. One of the display fields is displayed, depending on the display position in which the display device is located, wherein the displayed display field also changes when the display position is altered.

The two display fields may be arranged, for example, on the housing and selectively covered by the actuating element which is adjustable relative to the housing. For example, the actuating element may have a recess which may be brought into congruence with a display field so that via the recess just one display field is visible. In the first position of the connection element, the recess of the actuating element is congruent with the first display field so that via the first display field the display device is visible via the recess. If when closing the closure device the connection element is transferred from its first position into the second position, the actuating element is also moved and as a result the recess is brought into congruence with the second display field, so that the second display field is visible and as a result it is displayed that the closure device has been transferred into its closed position.

In the closed position of the closure device a connection is produced between the closure parts. The connection in this case is such that the second closure part is held on the first closure part counter to the attachment direction and/or transversely to the attachment direction.

For example, with a foot mat it is necessary for the closure device to absorb forces acting in the extension plane of the foot mat, in particular transversely to the attachment direction, in order to prevent a transverse displacement of the foot mat. The closure device thus has to be designed, in particular, in order to absorb and divert transverse forces causing shear.

Additionally, however, it may also be provided that the closure device provides a safe, for example positive, retention counter to the attachment direction, so that the closure parts may not be released easily, in any case not without actuating the actuating element counter to the attachment direction.

The connection element is movably arranged on the housing of the second closure part. For example, the connection element in this case may be mounted on the housing in a linear displaceable manner, in a tiltable manner about a tilting axis oriented transversely to the attachment direction or in a rotatable manner about a rotational axis oriented longitudinally in the attachment direction, so that the connection element may be moved in a linear or rotational manner relative to the housing. When attaching the closure parts onto one another the connection element is displaced in a linear manner (with a linear displaceable mounting), tilted (with a tiltable mounting) or rotated (with a rotatable mounting) and a connection of the closure parts with one another is produced and the closure device thus closed.

The first closure part preferably has at least one first connection portion which, when attaching the connection element of the second closure part, comes to bear against the first closure part with at least one second connection portion of the connection element and as a result moves the connection element relative to the housing in the adjustment direction. The connection portions of the first closure part, on the one hand, and of the connection element of the other second closure part, on the other hand, impinge on one another when attaching the closure parts to one another, whereby a force acts on the connection element for moving said connection element into the adjusting direction which differs from the attachment direction.

The at least one first connection portion of the first closure part and/or the at least one second connection portion of the connection element of the second closure part are advantageously at least partially inclined relative to the attachment direction and thus have an incline relative to the attachment direction. The connection portions predetermine the movement of the connection element when attaching the closure cell, by converting an action of force in the attachment direction, such that a force component also acts in the adjusting direction, and as a result adjusting the connection element in the adjusting direction.

Different embodiments of the connection portions are conceivable and possible.

For example, with a linear displaceable mounting of the connection element on the housing of the second closure part, the connection portions are configured as guide portions extending in a linear manner and inclined obliquely to the attachment direction in the manner of oblique planes. When attaching the closure parts to one another the connection portions impinge on one another and cause the connection element, for example, to be adjusted transversely to the attachment direction on the housing. Due to the incline of the connection portions, therefore, a force component acts on the connection element which causes an adjustment of the connection element in the adjusting direction.

With a tiltable mounting, a connection portion may be inclined obliquely to the attachment direction whilst the other connection portion may be configured, for example, as a pin so that by the pin-shaped connection portion impinging on the obliquely inclined connection portion a tilting of the tiltably mounted connection element may be effected.

With a rotatable mounting of the connection element on the housing of the second closure part, the connection portions may be configured, for example, as thread pitches which impinge on one another when the closure parts are attached to one another and, as a result, cause a rotation of the connection element relative to the housing. The thread pitches in this case are inclined relative to the attachment direction so that when attaching the closure parts to one another a force component—caused by the impingement of the thread pitches on one another—acts around the attachment direction and, as a result, the connection element is rotated around the attachment direction relative to the housing when the closure parts are attached to one another.

When attaching the closure parts to one another the connection portions impinge on one another, wherein by means of the impingement a force component is effected in the adjustment direction and, as a result, the connection element is adjusted. The connection portions are in this case shaped and inclined in the attachment direction such that self-locking is not present, i.e. when the closure parts are attached in the attachment direction, this results in a deflection of force for moving the connection element into the adjustment direction. If the connection portions are configured, for example, as thread pitches, the thread pitches are correspondingly inclined steeply such that the thread pitches may impinge on one another and, as a result, the connection element may be rotated.

It is conceivable and possible here that the thread pitches are shaped such that, during closing, self-locking is not present but, during opening, i.e. when the second closure part is under load counter to the attachment direction, self-locking is present so that the closure parts may not be released easily from one another, in any case not without the actuating element being actuated to adjust the connection element counter to the adjustment direction. For example, when opening the closure device the connection portions come to bear against one another with different sides, wherein on these sides the connection portions may have a different incline relative to the attachment direction so that if required self-locking is present.

It is also conceivable and possible, however, that even when opening the closure device self-locking is not present between the connection portions. The result of this is that by pulling on the second closure part counter to the attachment direction, the closure device may be easily opened without actuating the actuating element, by the closure parts being easily pulled apart from one another. When the second closure part is under load counter to the attachment direction, the connection element is moved counter to the adjustment direction by the connection portions impinging on one another, and as a result the closure device is opened, so that the closure parts may be separated from one another.

It is conceivable and possible in a further variant that in each case at least one positive connection portion is arranged on the connection portions, said positive connection portions coming into positive engagement with one another counter to the attachment direction, when the second closure part is under load, such that a rotation of the connection element is locked relative to the first closure part and thus also relative to the housing. The positive connection portions only come into engagement with one another when the second closure part is under load counter to the attachment direction so that, when loaded, the retention of the closure line relative to one another is reinforced and, in particular, an opening of the closure device under load is excluded. If the closure device is not under load, the positive connection portions do not come into engagement with one another so that by actuating the actuating element the connection element may be transferred from its second position counter to the adjustment direction into the first position in order to release the connection between the closure parts in this manner and to open the closure device.

The connection element may, for example, be pretensioned by a spring element relative to the housing. The spring element may be designed, for example, as a helical spring and act between the actuating element and the housing in the direction of the first position of the connection element. The spring element in this case is dimensioned such that after opening the closure device the connection element is automatically transferred into its first position so that when the closure device is open the connection element is always in its first position. Accordingly, the display device also adopts the first display position and thus displays that the closure device is open.

The pretensioning of the connection element in the first position may alternatively be effected magnetically, for example.

Advantageously, the force path of the pretensioning in this case is such that the pretensioning force reduces in the direction of the second position, and thus the pretensioning force becomes weaker during closure.

It may also be understood by the connection element being pretensioned in the direction of the first position that the connection element is held in a pretensioned manner after being moved into the first position but, with an adjustment from the first position into the second position, potentially no (more) pretensioning force acts and thus a return to the first position does not take place. In particular, for example, in the second position potentially no pretensioning force is able to act in the direction of the first position. A pretensioning force begins to act only after a movement has started in the direction of the first position or the first position is reached.

The closure device may be designed, in principle, purely mechanically, i.e. without additional magnetic elements assisting the attachment of the closure parts to one another.

It is also conceivable and possible, however, to provide on each closure part one or more magnetic devices, i.e. for example in each case a magnet or, on the one hand, a magnet and, on the other hand, a magnetic armature, i.e. a structural element consisting of a ferromagnetic material. The magnetic devices oppose one another in a magnetically attractive manner when attaching the closure parts and cause the attachment of the closure parts to one another to be magnetically assisted, wherein the magnetic elements are preferably dimensioned such that the closure of the closure device in a convenient manner for the user may take place substantially automatically if the closure parts are moved toward one another.

If magnetic devices are provided they may also cause a movement of the connection element when the closure parts are attached to one another. For example, magnets may be arranged relative to one another on the first closure part and the connection element, such that when attaching the closure parts to one another a magnetic force component is also produced in the direction of the adjustment direction, the connection element being adjusted thereby in the adjustment direction.

For example, in each case magnetic devices with a plurality of poles offset relative to one another transversely to the attachment direction may be provided on the first closure part and the connection element, said magnetic devices producing a magnetic force component transversely to the attachment direction (with a linear displaceable or tiltable mounting of the connection element) or around the attachment direction (with a rotatable mounting of the connection element).

Such a magnetic force component oriented in the adjustment direction which differs from the attachment direction may be produced, in principle, by the offset arrangement or by the suitable shaping of the magnetic elements on the first closure part and the connection element.

A closure device of the type described here may be used, for example, in a fastening arrangement such as a foot mat. The first closure part in this case is arranged on a first fastening element, for example fixedly to a vehicle floor, whilst the second closure part for example is arranged on the foot mat to be fastened to the vehicle floor. The first closure part may be configured, for example, as a pin arranged fixed to the vehicle floor. The second closure part is thus integrated, for example, in the foot mat, wherein the housing is fastened to the foot mat and the connection element is movable relative to the housing.

BRIEF DESCRIPTION OF THE DRAWINGS

The idea underlying the invention is intended to be described in more detail hereinafter with reference to the exemplary embodiments shown in the figures, in which.

DETAILED DESCRIPTION OF THE INVENTION

FIGS. 1A, 1B to 4A, 4B show in different views a first exemplary embodiment of a closure device 1 which comprises two closure parts 2, 3. The closure parts 2, 3 may be attached to one another for closing the closure device 1 in an attachment direction X and are connected together in a closing direction (see FIGS. 4A, 4B).

Figure 1A:
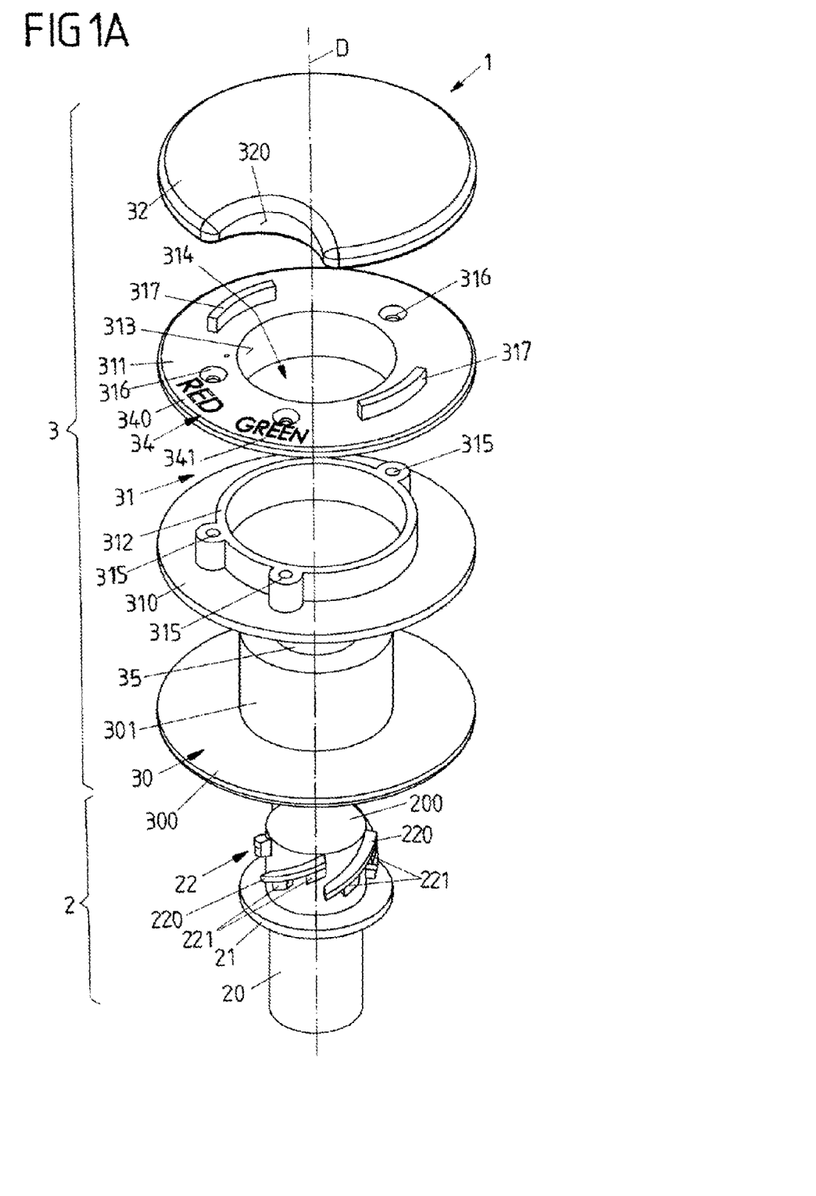
FIG. 1A shows an exploded view of an exemplary embodiment of a closure device.
Figure 1B:
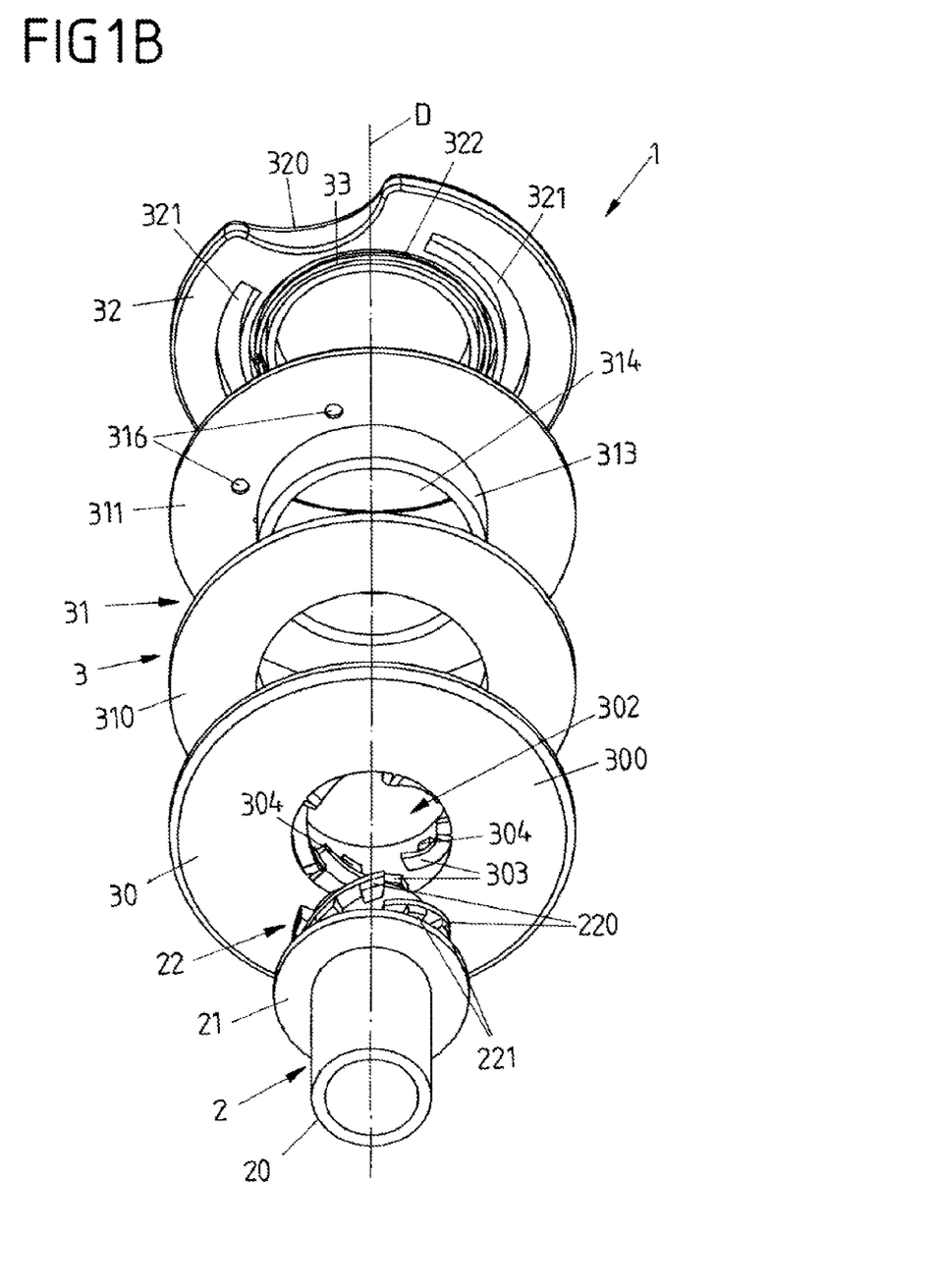
FIG. 1B shows a further exploded view of the closure device.
Figure 2:
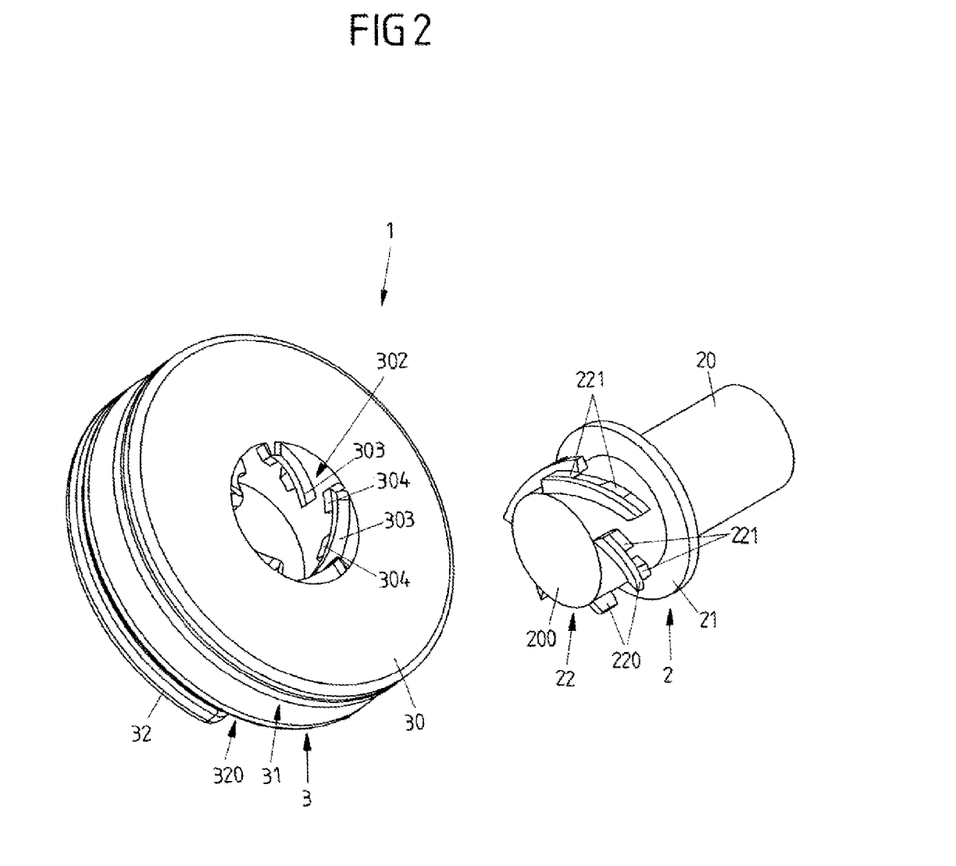
FIG. 2 shows a view of the closure device with two closure parts in the separated position.

The closure device 1 has a first closure part 2 and a second closure part 3. The first closure part 2 comprises a shaft 20 which bears a collar 21 and at one end 200 a connecting device 22 with connection portions 220 in the form of thread pitches offset to one another circumferentially around the shaft 20. On the rear face of the connection portions 220, i.e. on a side facing toward the collar 21, the connection portions 220 have positive connection elements 221 in the form of projecting teeth, the function thereof being intended to be described hereinafter in more detail.

Figures 3A, 3B:
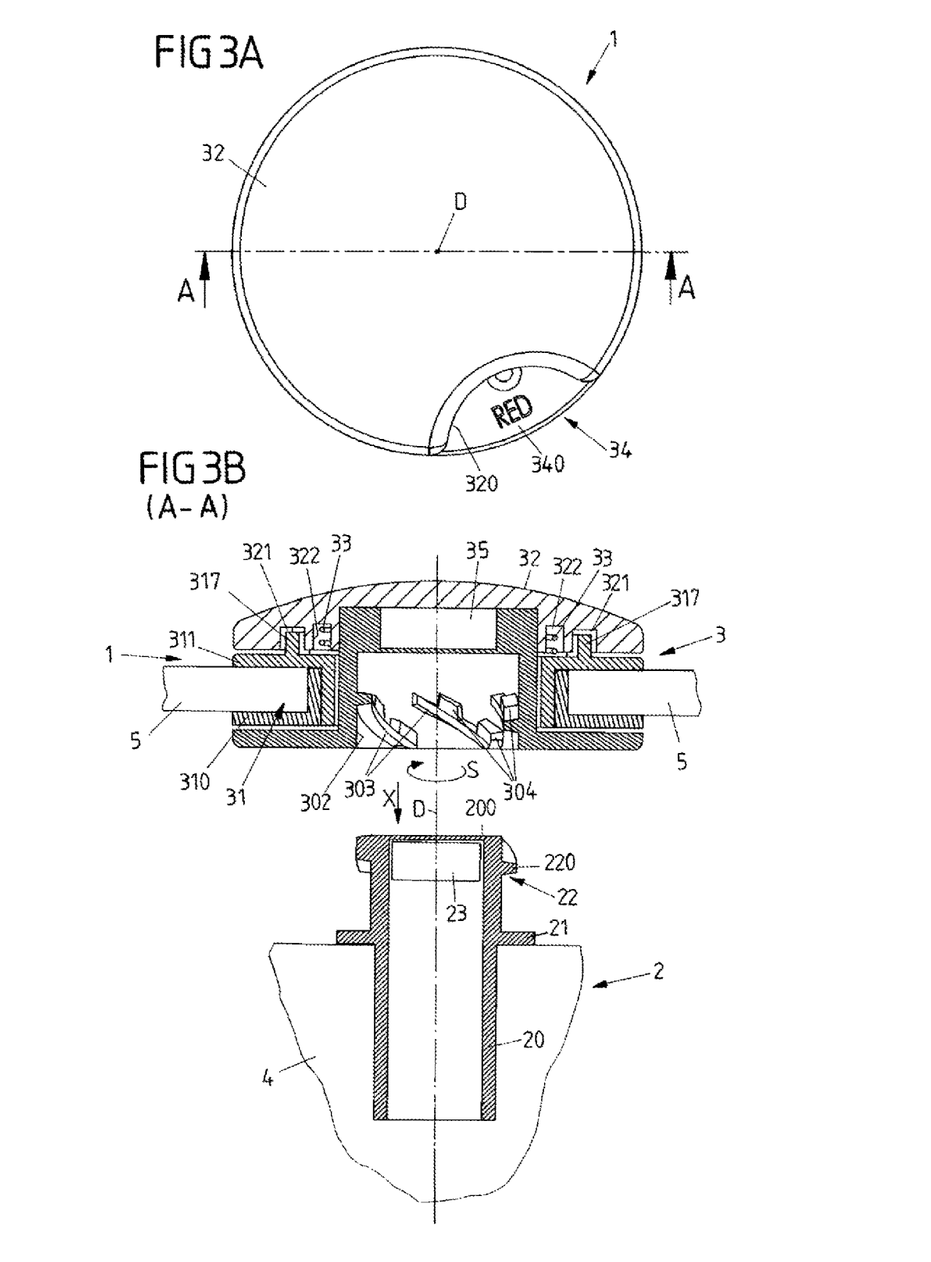
FIG. 3A shows a plan view of the closure device before closing the closure device.
FIG. 3B shows a sectional view along the line A-A according to FIG. 3A.

The first closure part 2 may be arranged, for example, fixedly on a fastening element, for example a vehicle floor 4 (see FIG. 3B).

The second closure part 3 has a housing 31 which is made up of two housing parts 310, 311. The first housing part 310 has a ring 312, the second housing part 311 with a ring 313 being inserted therein. Via fastening points 315, 316 the housing parts 310, 311 are fixedly connected together, for example via screw connections.

Between the housing parts 310, 311 of the housing 31 a fastening element, for example a foot mat 5 (see FIG. 3B), is held in a clamped manner, so that the housing 31 is secured to the fastening element.

The ring 313 of the second housing part 311 encloses a bearing opening 314, a connection element 30 via a ring 301 being rotatably mounted therein about a rotational axis D. The connection element 30 has a collar 300 which bears against the first housing part 310. From the collar 300, the ring 301 extends through the opening 314 in the ring 313 of the second housing part 311 and is connected fixedly in terms of rotation at its end remote from the collar 300 to an actuating element 32 (see for example FIG. 3B). The actuating element 32 and the connection element 30 thus form a unit which is rotatably mounted on the housing 31 around the rotational axis D.

Stops 317, which protrude into receiving openings 321 (see FIG. 1B) on the lower face on the actuating element 32, are configured on the side of the second housing part 311 facing the actuating element 32. The path of rotation of the unit formed by the actuating element 32 and the connection element 30 is limited relative to the housing 31 via the stops 317 protruding into the receiving openings 321.

The actuating element 32 is pretensioned via a spring element 33 (see FIG. 3B) which is introduced on the lower face of the actuating element 32 in a receiving groove 322, relative to the housing 31 in the direction of a first position. The unit formed by the connection element 30 and the actuating element 32 is located in this first position when the closure device 1 is not closed, thus when the closure parts 2, 3 are not attached to one another.

An opening 302 in the manner of a blind hole is configured inside the ring 301 on the connection element 30, connection portions 303 in the form of thread pitches offset circumferentially to one another being configured on the internal cylindrical surface thereof. On a side facing inwardly, these connection portions 303 bear positive connection elements 304 in the manner of protruding teeth (similar to the connection portions 220 on the shaft 20 of the first closure part 2).

For closing the closure device 1, the second closure part 3 with the fastening element 5, for example in the form of a foot mat arranged thereon, may be attached to the first closure part 2 fastened fixedly to the other fastening element 4, for example a vehicle floor, by the opening 302 on the connection element 30 being positioned onto the end 200 of the shaft 20.

This is shown in FIG. 3B. The second closure part 3 in this case is moved closer to the first closure part 2 in an attachment direction X so that the connection portions 303 in the opening 302 of the connection element 30 impinge on the connection portions 220 at the end 200 of the shaft 20 of the first closure part 2. As a result, the connection element 30 is rotated in an adjustment direction S around the attachment direction X, so that the connection portions 220, 303 come into engagement with one another in the manner of a screw.

The incline of the connection portions 220, 303 in the form of thread pitches on the shaft 20 and/or on the opening 302 is sufficiently great that self-locking is not present. In this manner, when the closure parts 2, are attached to one another in the attachment direction X, the connection portions 220, 303 impinge on one another and thus effect a rotation of the connection element 30 around the attachment direction X.

Figure 4A:
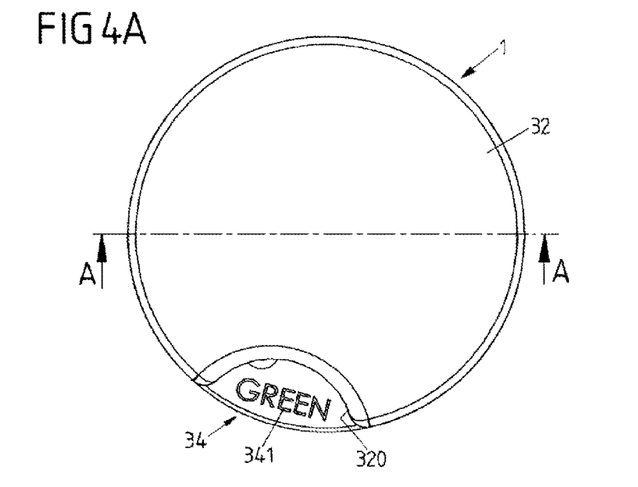
FIG. 4A shows a plan view of the closure device in the closed position of the closure device.
Figure 4B:
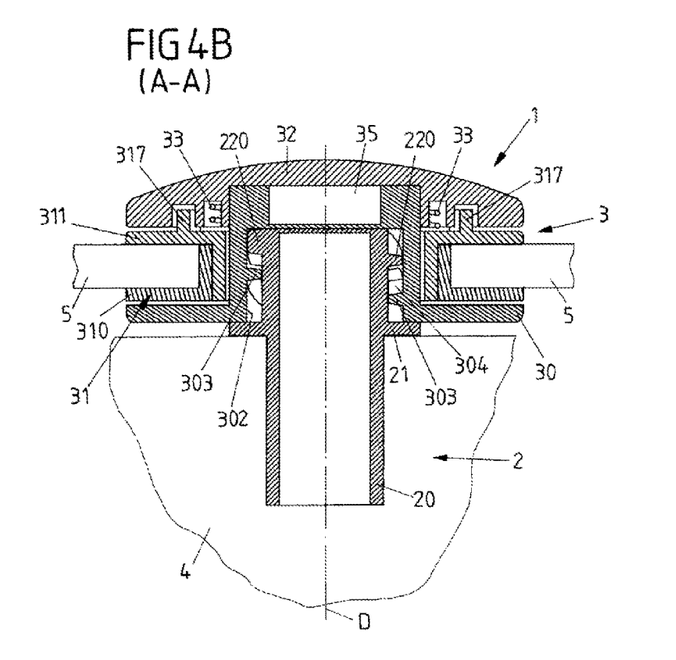
FIG. 4B shows a sectional view along the line A-A according to FIG. 4A.

In a closed position shown in FIG. 4B, the connection portions 220 of the first closure part 2 engage behind the connection portions 303 on the connection element 30 of the second closure part 3. The first closure part 2 thus is engaged with the connection element 30 of the second closure part 3 in the manner of a screw, so that a connection is produced between the closure parts 2, 3.

In the closed position the connection portions 220, 303 oppose one another in the attachment direction X with a spacing if the closure device 1 is not under load. Accordingly, when the closure device 1 is not under load the positive connection elements 220, 303 are not in engagement with one another. If, however, a loading force acts in a loading direction F counter to the attachment direction X on the second closure part 3, the positive connection elements 221, 304 on the connection portions 220, 303 come into positive engagement with one another so that a rotation of the connection element 30 relative to the first closure part 2 is blocked. The threaded engagement between the first closure part 2 and the connection element 30 is thus locked so that the closure device 1 is not able to be opened under load.

In each case a magnetic element 23, 35 is arranged on the first closure part 2 and on the connection element 30 of the second closure part 3, said magnetic elements interacting magnetically such that the attachment of the closure parts 2, 3 to one another is magnetically assisted in the attachment direction X. The magnetic elements 23, 35 may in each case be formed as a magnet or, on the one hand, as a magnet and, on the other hand, as a magnetic armature, i.e. as a component produced from a ferromagnetic material. The magnetic elements 23, 35 when the closure parts 2, 3 are moved toward one another, oppose one another with magnetic attraction so that a force of magnetic attraction acts between the magnetic elements 23, 35 and, as a result, the connection element 30 is attracted to the first closure part 2.

The magnetic elements 23, 35 are advantageously dimensioned such that when the closure parts 2, 3 are moved toward one another, the closure of the closure device 1 may take place substantially automatically. In particular, the magnetic elements 23, 35 are dimensioned such that the connection portions 220, 303 impinge on one another automatically by the magnetic action and the connection element 30 is correspondingly rotated when attached onto the first closure part 2.

Due to the magnetic action of the magnetic elements 23, 35, when the closure device 1 is not under load the closure parts 2, 3 are held relative to one another in the position according to FIG. 4B. In this position, the positive connection elements 221, 304 are spaced apart from one another on the connection portions 220, 303 in the attachment direction X and are not in engagement with one another, so that the closure device 1 may be opened by actuating the actuating element 32.

Only when the second closure part 3 is under load in the loading direction F, which opposes the attachment direction X, do the positive connection elements 221, 304 come positively into engagement, so that a rotation of the connection element 30 relative to the first closure part 2 is locked and thus an opening of the closure device 1 is not possible.

For the opening, the actuating element 32—when the closure device 1 is not under load—together with the connection element 30 may be rotated counter to the adjustment direction S so that the connection portions 220, 303 may be brought out of engagement in the manner of a screw and the closure parts 2, 3 may be separated from one another. This is only possible when the closure device 1 is not under load. When the closure device 1 is under load, such a rotational movement is blocked by the engagement of the positive connection elements 221, 304 in one another.

The second closure part 3 has a display device 34 which serves to display the position in which the closure device 1 is located. In particular, the display device 34 serves to display whether the closure device 1 is open or has been transferred into its closed position.

The display device 34 has two display fields 340, 341 which are attached to the second housing part 311 on a side facing the actuating element 32 and which bear different markings. A recess 320 on the actuating element 32 is assigned to these display fields 340, 341, wherein depending on the position of the actuating element 32 the recess 320 is congruent with the one display field 340 or the other display field 341. Depending on the position of the actuating element 32, therefore, the one display field 340 or the other display field 341 is visible from the outside.

In the first position of the connection element 30 the recess 320 on the actuating element 32 is congruent with the display field 340 of the display device 34, as shown in FIG. 3A. The connection element 30 is in this position due to the pretensioning of the spring element 33 when the closure device 1 is not closed.

When the closure device 1 is closed, however, the recess 320 is congruent with the other display field 341, as shown in FIG. 4A. The unit formed by the actuating element 32 and the connection element 30 reach this position when the closure device 1 is closed.

When a foot mat 5 is attached to a vehicle floor 4, in this manner it may be easily identified when the connection of the foot mat 5 to the vehicle floor 4 is produced. If the connection is not yet (completely) produced a user identifies this easily by means of the currently visible display field 340, 341.

In the exemplary embodiment according to FIGS. 1A, 1B and 4A, 4B, the connection element 30 is rotatable relative to the housing 31 around the rotational axis D. Accordingly, the connection portions 220, 303 are designed as thread pitches which impinge on one another when the closure parts 2, 3 are attached and in this manner effect a rotation of the connection element 30.

In a further exemplary embodiment shown schematically in FIGS. 5A, 5B and 6A, 6B, however, the connection element 30 may also be arranged in a linear displaceable manner on the housing 31, wherein in this case the connection portions 220, 303A, 303B are formed as longitudinal guide portions extending in a linear manner and configured in the manner of oblique planes.

Figure 5A:
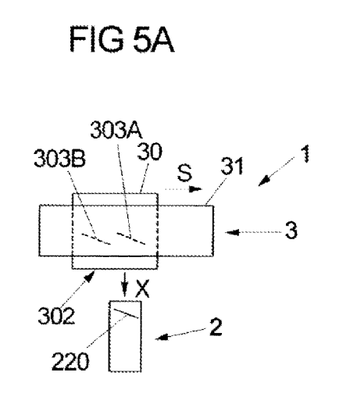
FIG. 5A shows a schematic view of a further exemplary embodiment of a closure device in the open position.
Figure 5B:
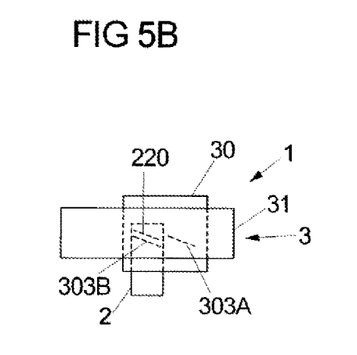
FIG. 5B shows a schematic view of the closure device in the closed position.
Figure 6A:
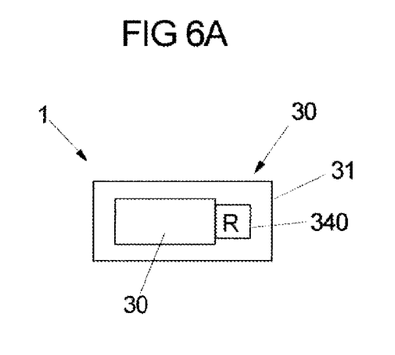
FIG. 6A shows a plan view of the closure device in the position according to FIG. 5A.
Figure 6B:
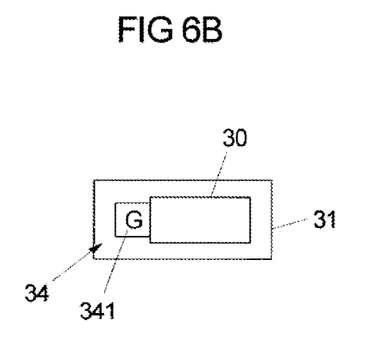
FIG. 6B shows a plan view of the closure device in the position according to FIG. 5B.

When attaching the second closure part 3 to the first closure part 2 in the attachment direction X, the connection portion 220 extending in a linear manner on the first closure part 2 impinges on a first connection portion 303A on the connection element 30 of the second closure part 3. In this manner, during the attachment, the connection element 30 is adjusted in a linear adjustment direction S relative to the housing 31, as is visible from the transition from FIG. 5A to FIG. 5B. In the closed position, the connection portion 220 of the first closure part 2 engages behind a second connection portion 303B on the connection element 30 so that a connection is produced between the closure parts 2, 3. This is shown in FIG. 5B.

Depending on the position of the connection element 30 relative to the housing 31 a first display field 340 (FIG. 6A) or a second display field 341 (FIG. 6B) of the display device 34 is visible, so that the position in which the closure device 1 is currently located may be identified. In particular, it may be identified immediately whether the closure device 1 is completely closed or not.

Figure 7A:
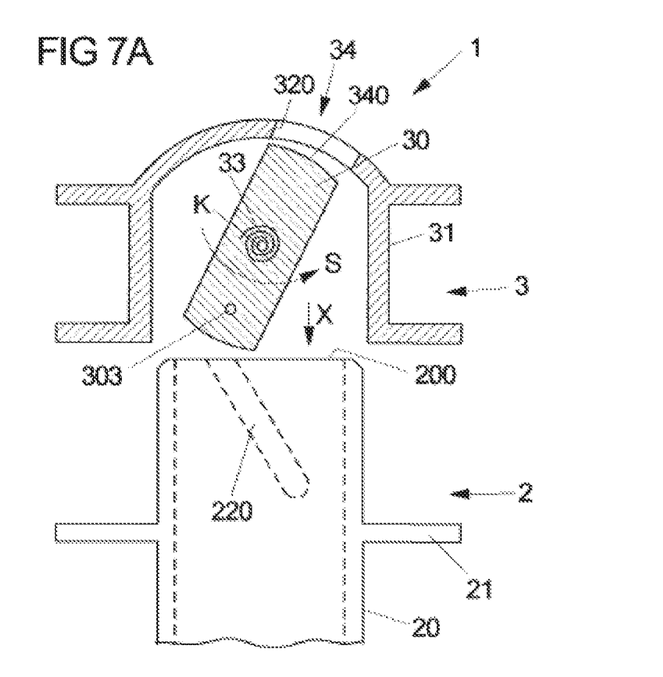
FIG. 7A shows a schematic view of a closure device with a tiltably mounted connection element in the open position of the closure device.
Figure 7B:
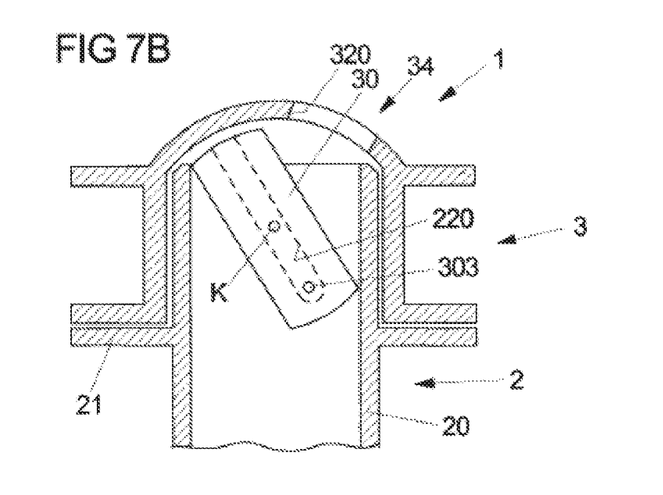
FIG. 7B shows a schematic view of the closure device according to FIG. 7A in the closed position of the closure device.

FIGS. 7A and 7B show a further exemplary embodiment of a closure device 1. In the closure device 1 on a second closure part 3 a connection element 30 on a housing 31 is tiltably mounted about a tilting axis K. The tilting axis K extends transversely to an attachment direction X in which the second closure part 3 may be attached to a first closure part 2 for closing the closure device 1.

The tiltable connection element 30 has a connection portion 303 in the form of a pin. However, a connection portion 220 in the form of a slotted guide extending obliquely to the attachment direction X is formed on the first closure part 2. When the closure parts 2, 3 are attached to one another, the pin-shaped connection portion 303 impinges on the connection element 30 in the slotted guide-shaped connection portion 220 on the first closure part 2 so that, when the closure parts 2, 3 are attached, the pin-shaped connection portion 303 runs along the slotted guide-shaped connection portion 220 and, as a result, the connection element 30 is tilted about its tilting axis K in an adjustment direction S relative to the housing 30, as is visible in the transition of FIG. 7A to FIG. 7B.

A display field 340 of a display device 34 is formed at one end of the connection element 30 remote from the first closure part 2. In the open position of the closure device 1 (FIG. 7A) the display field 340 is congruent with a recess 320 on the housing 31 and, as a result, is visible from the outside. If when attaching the closure parts 2, 3 to one another the connection element 30 is tilted, the display field 340 moves out of the region of the recess 320 and is thus no longer visible from the outside. In this manner, it is displayed that the closure device 1 has been transferred into its closed position where the closure parts 2, 3 are engaged with one another.

By pulling on the second closure part 3 counter to the attachment direction X, the closure parts 2, 3 may be released from one another. After releasing the closure parts 2, 3 from one another the connection element 30 returns to its first position (FIG. 7A) due to a pretensioning force which is exerted by a spring element 33 on the connection element 30 in the direction of the first position.

The idea underlying the invention is not limited to the exemplary embodiments set forth above, but may also be implemented in a completely different manner.

The closure device may be designed as a magnetic closure device with additional magnetic elements which magnetically assist the attachment of the closure parts to one another.

It is conceivable and possible, however, to design the closure device as a purely mechanically acting closure device, in which no magnetic elements are present for magnetically assisting the attachment. In this case, the closure parts may be attached to one another and are mechanically held against one another in the closed position, wherein during the attachment it may lead to an adjustment of the connection element and also to a change of the display position of the display device.

A closure device of the type described here is not only able to be used for connecting a foot mat to a vehicle floor but may also be used elsewhere in any other manner. A closure device of the type described here is, in particular, able to be used expediently where it is intended to be displayed safely and reliably whether the closure device is completely closed or not, i.e. in particular for fastening safety-relevant parts.

LIST OF REFERENCE NUMERALS

1 Closure device
2 Closure part
20 Shaft
200 End
21 Collar
22 Connecting device (thread)
220 Connection portion (thread pitches)
221 Positive connection elements (teeth)
23 Magnet
3 Closure part
30 Connection element
300 Collar
301 Ring
302 Opening
303, 303A, 303B Connection portion (thread pitches)
304 Positive connection elements (teeth)
31 Housing
310, 311 Housing part
312 Ring
313 Ring
314 Bearing opening
315 Fastening points
316 Fastening points
317 Stops
32 Actuating element
320 Recess
321 Receiving opening
322 Receiving groove
33 Spring element
34 Display device
340, 341 Field
35 Magnet
4, 5 Fastening element
D Rotational axis
F Loading direction
K Tilting axis
O Opening direction
S Adjustment direction
X Attachment direction

The invention claimed is:

1. A closure device for connecting two parts with one another, comprising:
   a first closure part;
   a second closure part attachable along an attachment direction to the first closure part, closure part comprising a housing and a connection element arranged movably on the housing along an adjustment direction which differs from the attachment direction, and
   a display device,
   wherein the connection element for closing the closure device is attachable to the first closure part along the attachment direction and during attachment is moved along the adjustment direction relative to the housing from a first position into a second position, wherein the connection element in a closed position of the closure device is located in the second position and is connected to the first closure part such that the second closure part is held on the first closure part, wherein the connection element is pretensioned in the direction of the first position relative to the housing, wherein the display device is arranged on the second closure part and is adjustable, by a movement of the connection element, relative to the housing, the display device being located in a first display position in the first position of the connection element and in a second display position in the second position of the connection element, and wherein the first closure part comprises at least one first connection portion and the connection element comprises at least one second connection portion, wherein the at least one first connection portion, when the second closure part is attached to the first closure part, is configured to interact with the at least one second connection portion of the connection element, the first connection portion being configured to move the connection element relative to the housing in the adjustment direction during attachment of the second closure part to the first closure part.

2. The closure device as claimed in claim 1, wherein the connection element is connected to an actuating element such that the connection element is adjustable via the actuating element relative to the housing, wherein the display device is able to be adjusted by adjusting the actuating element.

3. The closure device as claimed in claim 1, wherein the display device has at least two display fields, a first display field being visible in the first position of the connection element and a second display field being visible in the second position of the connection element.

4. The closure device as claimed in claim 3, wherein the at least two display fields are arranged on the housing, wherein the actuating element has a recess which is congruent with one of the at least two display fields depending on the position of the connection element and, as a result, makes the respective display field visible.

5. The closure device as claimed in claim 1, wherein the connection element is held in the closed position counter to the attachment direction and/or transversely to the attachment direction on the first closure part.

6. The closure device as claimed in claim 1, wherein the connection element is mounted on the housing in a linearly displaceable manner, in a tiltable manner about a tilting axis oriented transversely to the attachment direction or in a rotatable manner about a rotational axis oriented along the attachment direction.

7. The closure device as claimed in claim 1, wherein the at least one first connection portion and/or the at least one second connection portion are inclined relative to the attachment direction.

8. The closure device as claimed in claim 1, wherein the at least one first connection portion and/or the at least one second connection portion are extended in a linear manner at an angle obliquely to the attachment direction.

9. The closure device as claimed in claim 1, wherein at least one of the at least one first connection portion and the at least one second connection portion are formed by at least one thread pitch extended in the adjustment direction.

10. The closure device as claimed in claim 1, wherein the interaction between the at least one first connection portion and the at least one second connection portion in the closed position is not self-locking, such that when the connection element is under load counter to the attachment direction, the connection element is caused to move relative to the housing counter to the adjustment direction and the closure parts are releasable from one another.

11. The closure device as claimed in claim 1, wherein at least one first positive connection portion is arranged on the at least one first connection portion and at least one second positive connection portion is arranged on the at least one second connection portion, wherein the at least one first positive connection portion and the at least one second positive connection portion come into positive engagement with one another when the connection element is under load, counter to the attachment direction, and block a movement of the connection element counter to the adjustment direction.

12. The closure device as claimed in claim 1, wherein the connection element is pretensioned by a spring element relative to the housing.

13. The closure device as claimed in claim 1, wherein a first magnetic device is arranged on the first closure part and a second magnetic device is arranged on the second closure part, wherein the first magnetic device and the second magnetic device when the closure parts are attached to one another oppose one another in a magnetically attractive manner such that the attachment is magnetically assisted.

14. The closure device as claimed in claim 1, wherein when the closure parts are attached to one another for closing the closure device, the connection element is magnetically moved in the adjustment direction.

15. A fastening arrangement comprising at least one closure device as claimed in claim 1, wherein the first closure part is fastened to a first fastening element and the housing of the second closure part is fastened to a second fastening element.

16. The fastening arrangement of claim 15, wherein the fastening arrangement is a foot mat arrangement.

17. The closure device as claimed in claim 2, wherein the display device has at least two display fields, a first display field being visible in the first position of the connection element and a second display field being visible in the second position of the connection element.

18. The closure device as claimed in claim 2, wherein the connection element is held in the closed position counter to the attachment direction and/or transversely to the attachment direction on the first closure part.

19. The closure device as claimed in claim 2, wherein the connection element is mounted on the housing in a linearly displaceable manner, in a tiltable manner about a tilting axis oriented transversely to the attachment direction or in a rotatable manner about a rotational axis oriented along the attachment direction.

* * * * *

UNITED STATES PATENT AND TRADEMARK OFFICE
CERTIFICATE OF CORRECTION

PATENT NO. : 10,315,549 B2
APPLICATION NO. : 15/124430
DATED : June 11, 2019
INVENTOR(S) : Joachim Fiedler Page 1 of 1

It is certified that error appears in the above-identified patent and that said Letters Patent is hereby corrected as shown below:

In the Claims

Column 12, Line 60, Claim 1, after "part," insert -- the second --

Column 14, Line 8, Claim 10, delete "such that" and insert -- such that, --

Signed and Sealed this
Twentieth Day of August, 2019

Andrei Iancu
*Director of the United States Patent and Trademark Office*